United States Patent [19]

Halacka et al.

[11] Patent Number: 5,755,461
[45] Date of Patent: May 26, 1998

[54] ENERGY ABSORBING DEVICE FOR A STEERING COLUMN

[75] Inventors: Michael F. Halacka, Bloomfield Hills; Mirjana Jurik; Thomas Dziegielewski, both of Rochester Hills; John Perri, Auburn Hills; Thomas Grzybowski, Fraser, all of Mich.

[73] Assignee: Chrysler Corporation, Auburn Hills, Mich.

[21] Appl. No.: 798,590

[22] Filed: Feb. 11, 1997

[51] Int. Cl.$^6$ ............................................. B62D 1/19
[52] U.S. Cl. ..................................... 280/777; 74/492
[58] Field of Search ........................ 280/777; 74/492; 188/371

[56] References Cited

U.S. PATENT DOCUMENTS 5,356,179  10/1994  Hildebrandt ..................... 280/777
5,498,032   3/1996  Thomas .......................... 280/777

*Primary Examiner*—Paul N. Dickson
*Attorney, Agent, or Firm*—Lawrence J. Shurupoff

[57] ABSTRACT

An energy-absorbing device for a steering column of an automotive vehicle comprising energy-absorbing straps on opposite sides of the steering column. The straps are made of relatively stiff, bendable, flexible strip material. Each strap has a laterally inner leg and a laterally outer leg secured to the inner leg by one or more rivets. The legs of each strap extend lengthwise of the steering column and have corresponding ends laterally connected together by a curved loop portion. The inner leg of each strap is rigidly connected to the steering column. The outer leg of each strap is rigidly connected to the instrument panel. The rivets are adapted to shear in a frontal impact to allow the inner leg of each strap to move with the steering column as it collapses, with the loop portion of each strap resisting such collapse to gradually absorb energy and prevent excessive reaction forces of the steering column against the driver.

9 Claims, 5 Drawing Sheets

ENERGY ABSORBING DEVICE FOR A STEERING COLUMN

This invention relates generally to energy-absorbing devices and more particularly to an energy-absorbing device for the steering column of an automotive vehicle.

BACKGROUND AND SUMMARY OF THE INVENTION

In a frontal impact caused, for example, by a head-on collision, the driver is often thrown forward against the steering wheel with great force. The result can be serious injury or death.

In accordance with this invention, an energy-absorbing device is provided which allows the steering column to collapse upon impact but with a controlled resistance to movement, gradually absorbing energy to prevent excessive reaction force against the driver.

The energy-absorbing device comprises a pair of straps made of a relatively stiff, bendable, flexible strip material. Each strap is preferably generally U-shaped, having one leg rigidly secured to the steering column, and another leg rigidly secured to vehicle support structure, preferably the instrument panel. When the steering column collapses, as in a frontal impact, the straps resist movement and absorb energy gradually, providing a controlled reaction force against the driver.

Preferably, the outer leg of each strap is secured to the inner leg by a rivet or rivets. The rivets are designed to shear when the steering column begins to collapse and thus do not interfere with the controlled absorption of energy. However, the rivets resist and control rattling, noise and vibration during normal operation of the vehicle.

One object of the invention is to provide an energy-absorbing device for a steering column having the foregoing features and capabilities.

Another object is to provide an energy-absorbing device which is composed of a relatively few simple parts, is sufficiently strong to support the steering column under normal conditions yet capable of controlling the collapse of the steering column in a frontal impact, and can be easily and inexpensively manufactured.

Other objects, features and advantages will become apparent as the following description proceeds, especially when considered with the accompanying drawings and claims.

DETAILED DESCRIPTION OF THE PREFERRED EMBODIMENT

Referring now more particularly to the drawings, a tubular steering column 10 extends longitudinally of the vehicle in which it is mounted, with a forward and downward tilt. A steering shaft 12 extends lengthwise within the steering column and has a steering wheel 14 at the upper end and a shaft coupler 16 at the lower end. The shaft coupler is adapted to be operatively connected to a steering gear assembly (not shown) to steer the front wheels of the vehicle.

Figure 1:
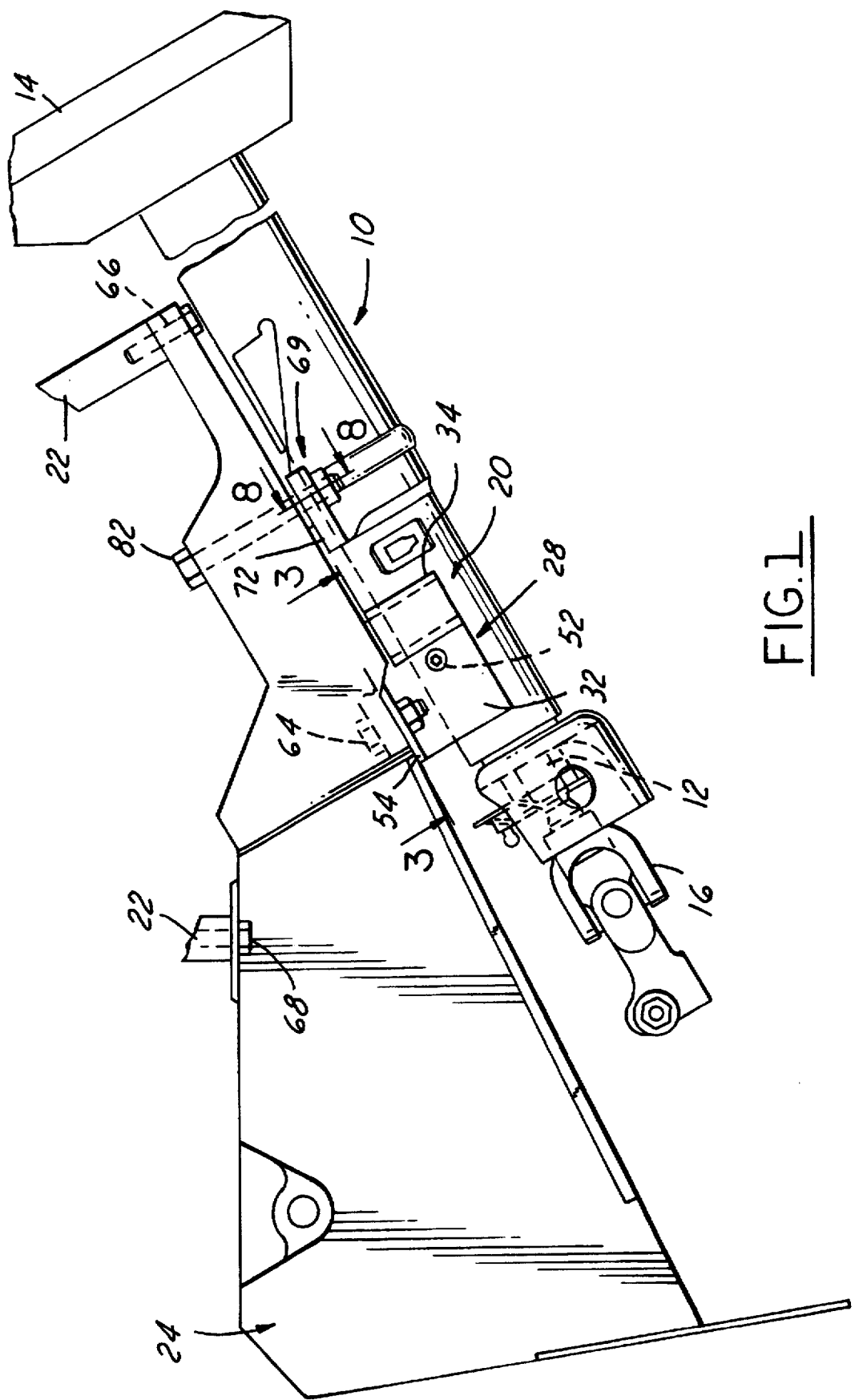
FIG. 1 is a side elevational view of an energy-absorbing device for a steering column of an automotive vehicle, constructed in accordance with the invention.
Figure 2:
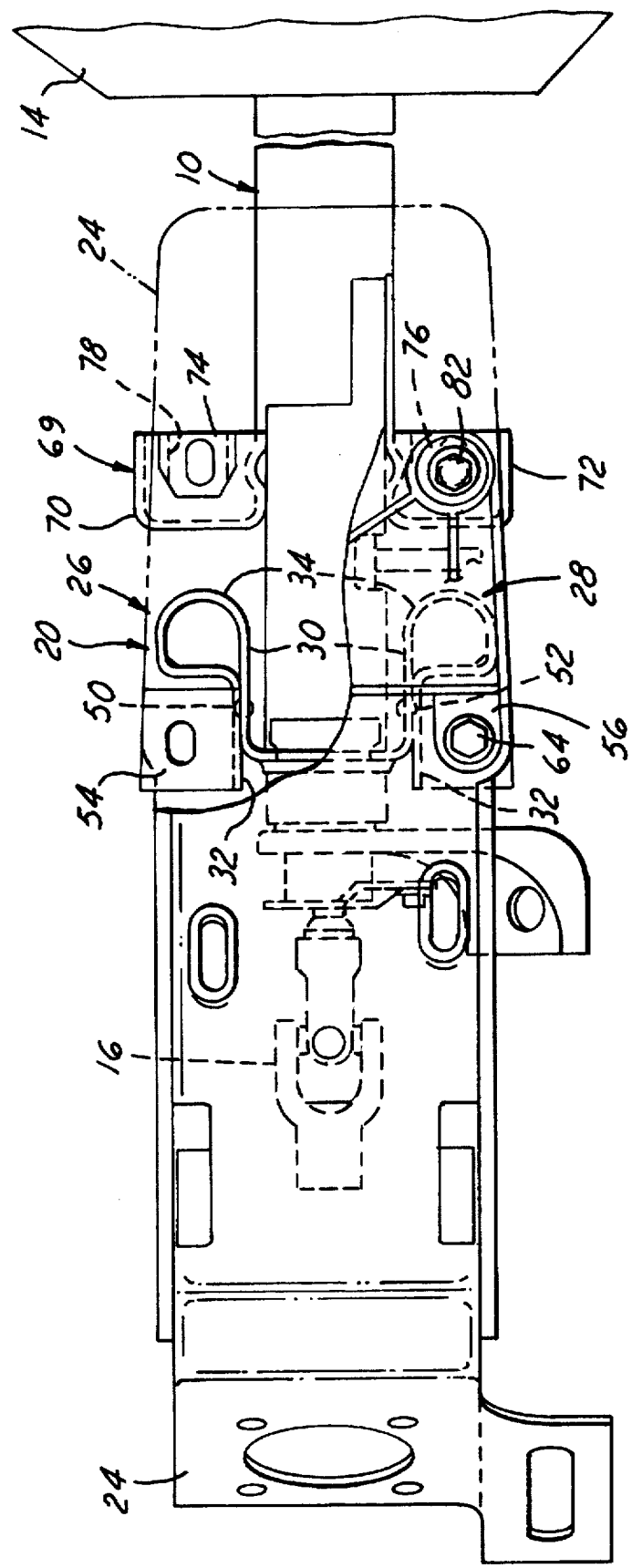
FIG. 2 is a top plan view, with parts broken away, of the structure shown in FIG. 1.
Figure 3:
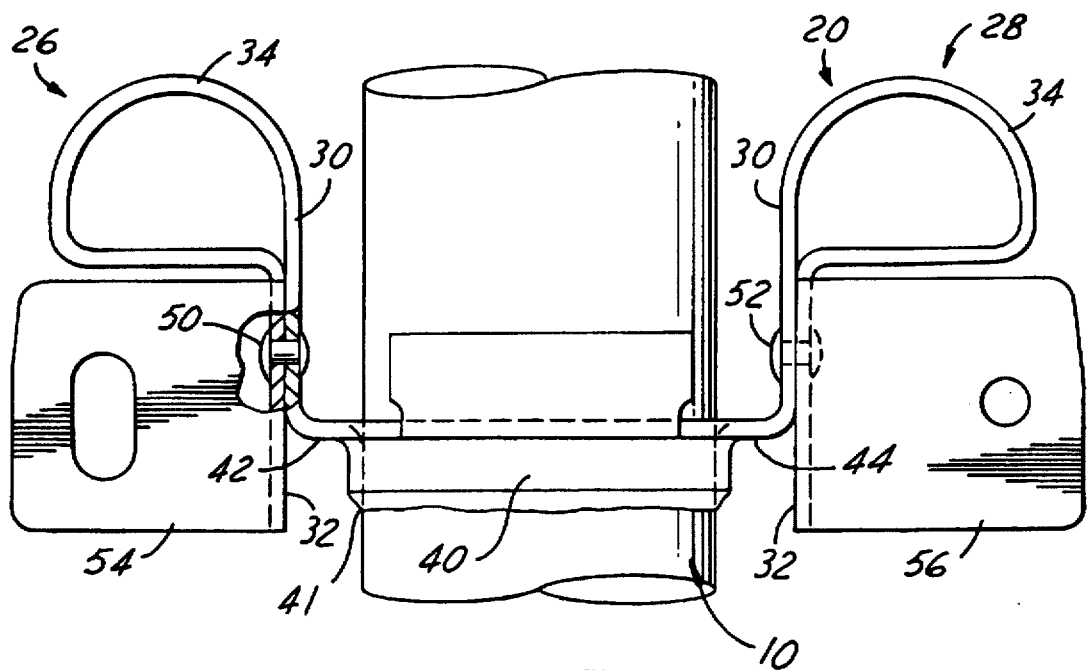
FIG. 3 is an enlarged, fragmentary view, taken on the line 3—3 in FIG. 1 and with parts in section, showing the energy-absorbing device in the normal condition.
Figure 4:
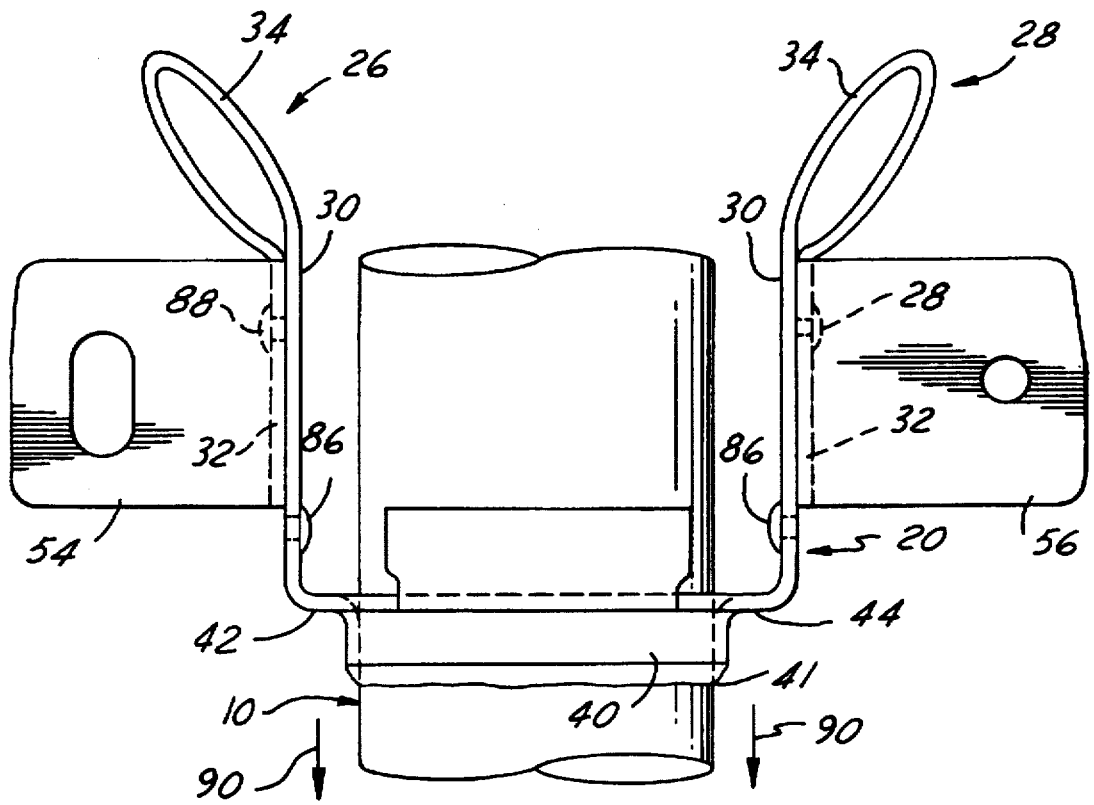
FIG. 4 is a view similar to FIG. 3, but showing the energy-absorbing device after the steering column has begun to collapse.
Figure 6:
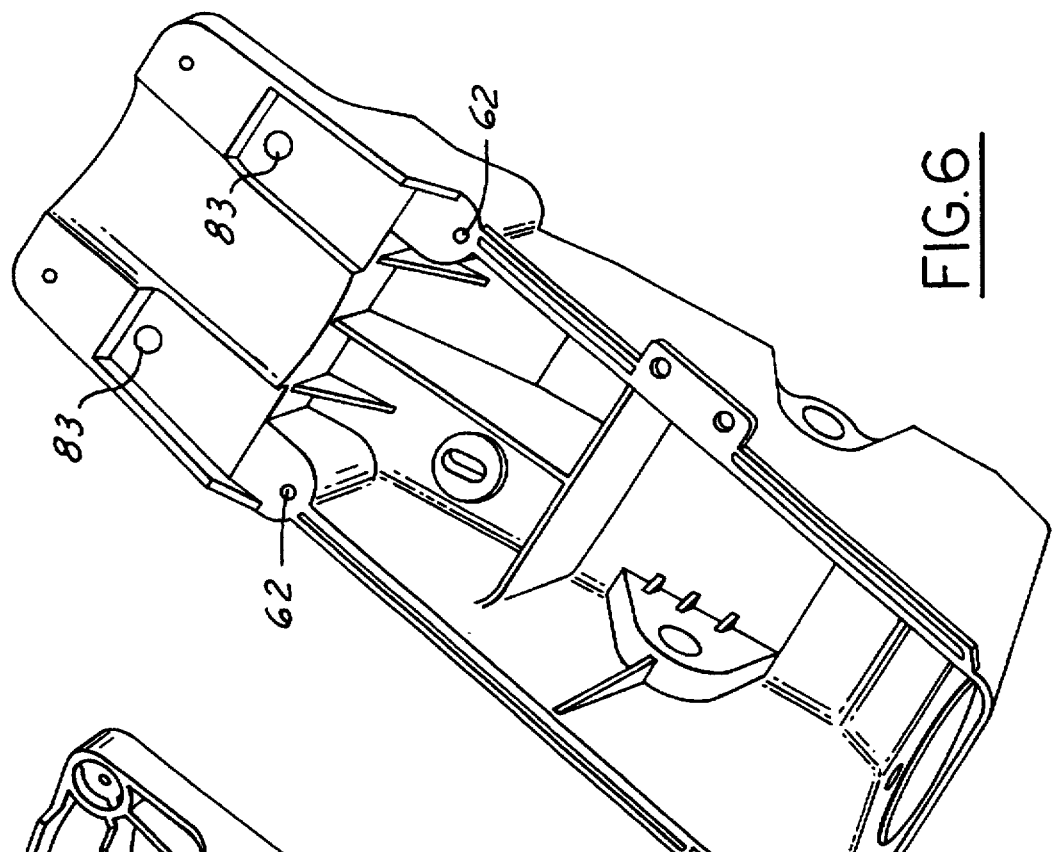
FIG. 6 is a perspective view of the bracket as seen from the opposite side.
Figure 5:
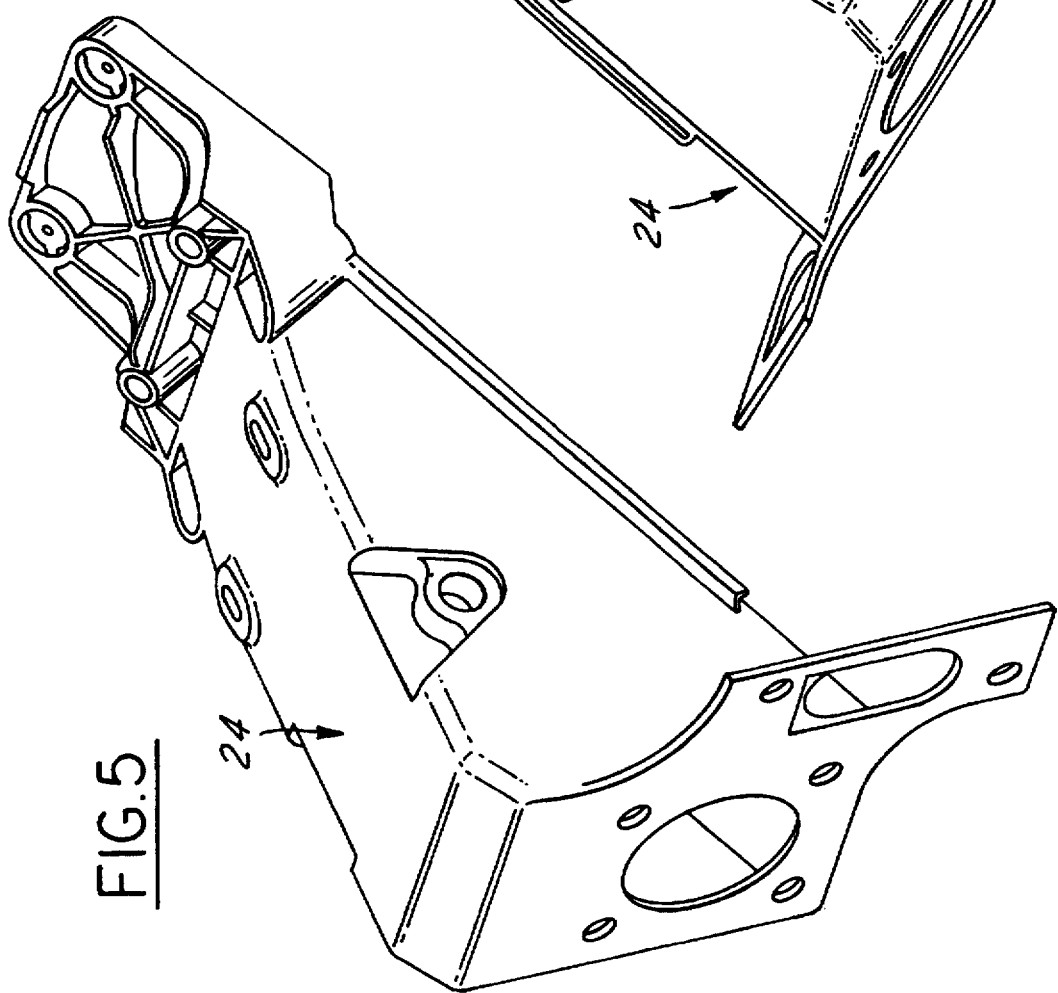
FIG. 5 is a perspective view of the bracket which connects the energy-absorbing device to the instrument panel.
Figure 7:
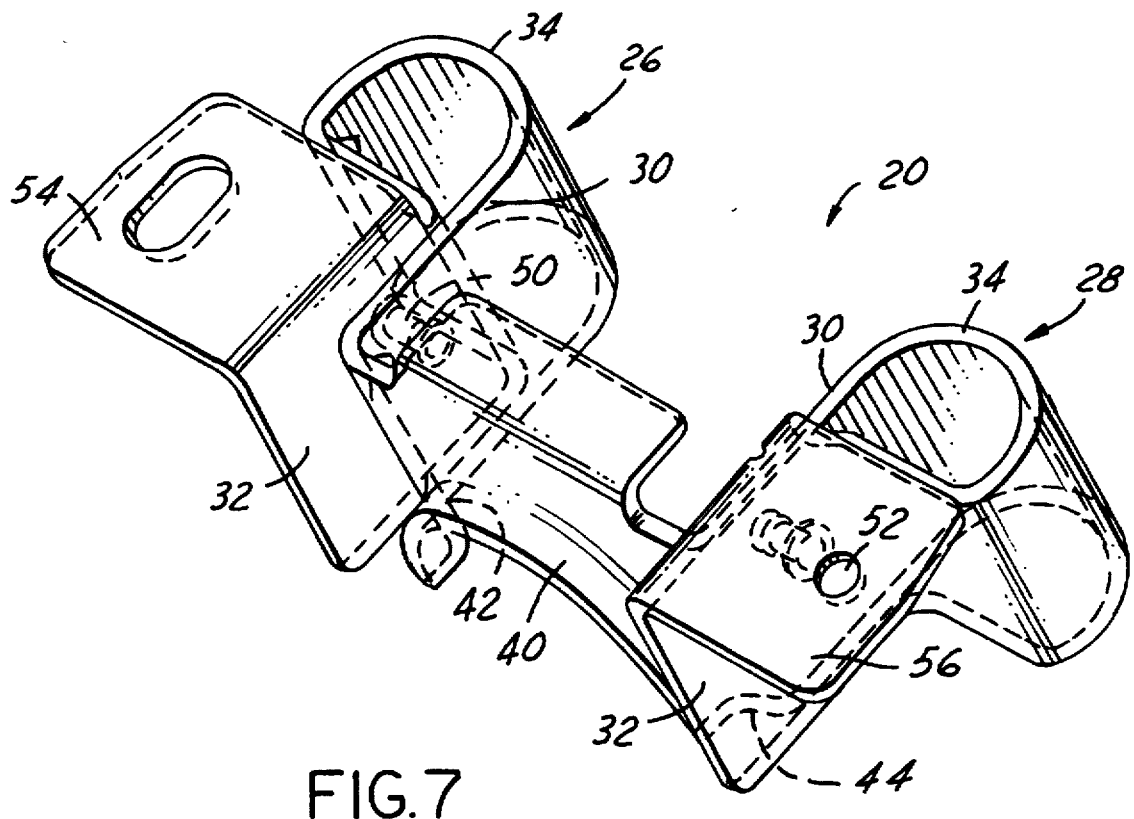
FIG. 7 is a perspective view of the energy-absorbing device.

An energy-absorbing device 20 is secured to the steering column 10 and is also rigidly secured to the instrument panel 22 by a bracket 24. The energy-absorbing device 20 comprises a pair of energy-absorbing straps 26 and 28 on opposite sides of the steering column. The straps 26 and 28 are made of relatively stiff, bendable, flexible, resilient strip material such as steel. The straps may be made into the shape and form shown in FIGS. 3, 4 and 7 from flat sheet material of uniform thickness.

Each strap 26, 28 is generally U-shaped, having a laterally inner leg 30 and a laterally outer leg 32. The inner and outer legs 30, 32 of each strap are in the form of flat plates and extend alongside one another in flush, side-by-side, surface-to-surface contacting relation.

The legs 30, 32 extend lengthwise of the steering column 10. Their rear ends are integrally connected by a curved loop portion 34. The curved loop portion 34 of each strap extends in an arc from the rear end of the inner leg 30 laterally outwardly beyond the plane of the outer leg 32, then forwardly and finally laterally inwardly to the rear end of the outer leg.

An arcuate, semi-circular band 40 is concentric with and extends at least partially around the steering column 10, having one edge 41 rigidly secured to the steering column as by welding. Flanges 42 and 44 project radially outwardly from the opposite edges of the band and are integrally connected to the forward ends of the inner legs 30 of the respective straps 26, 28. Preferably, the band 40, flanges 42, 44 and straps 26, 28 are of integral, one-piece construction.

The legs 30, 32 of each of the straps 26 are connected together by one or more fasteners 50, and the legs of the straps 28 are connected together by one or more fasteners 52. The fasteners 50 and 52 are shearable to release the connection between the strap legs in a frontal impact, as will be understood from the following description, and thus provide a releasable connection between the legs. The fasteners 50 and 52 are preferably rivets.

Integral with the upper edges of the outer legs 32 of the straps 26, 28 are laterally outwardly extending flanges 54 and 56. The flanges 54 and 56 are rigidly secured to the bracket 24 at 62 by nut and bolt assemblies 64. The bracket 24 is secured to the instrument panel 22 of the vehicle by nut and bolt assemblies 66 and 68.

Figure 8:
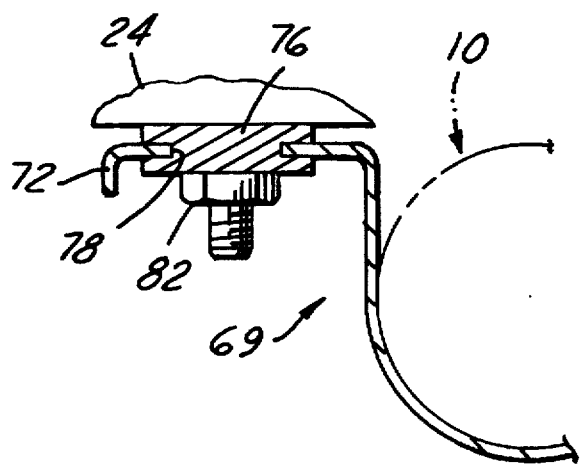
FIG. 8 is a sectional view taken on the line 8—8 in FIG. 1.

For added support, the steering column 10 rearwardly of the straps 26 and 28, has support structure 69 comprising laterally outwardly extending wings 70 and 72 which are welded or otherwise rigidly secured to the steering column. Capsules 74 and 76 are slidably engaged in slots 78 in the wings, which slots are elongated lengthwise of the steering column and open at their rear ends. As shown in FIG. 8, the opposite side edges of the slots 78 are slidably engaged in grooves in the side edges of the capsules. The capsules are rigidly secured as by nut and bolt assemblies 82 to the bracket 24 at 83 and are capable of sliding in the slots 78 in the event of a frontal impact.

During normal vehicle operation, the energy-absorbing device 20 and the support structure 69 hold the steering column securely, resisting any tendency to vibrate. The rivets 50 and 52 are of great importance in preventing vibration. However, in a frontal impact of sufficient magnitude to throw the driver against the steering wheel and cause the steering column to collapse in the direction of the arrows 90 in FIG. 4, the rivets 50 and 52 will shear. One half 86 and each rivet will move with the inner leg 30 of the associated strap while the other half 88 will remain with the outer leg 32. The curved loop portion 34 will roll into a smaller loop as the steering column collapses, to absorb energy gradually and prevent excessive reaction force against the driver. The capsules slide in the slots 78 and impose little or no resistance to steering column collapse, although they do guide the collapse of the steering column and prevent it from tilting upwardly.

What is claimed is:

1. An energy-absorbing device on a steering column of a vehicle comprising energy-absorbing straps on opposite sides of the steering column, said straps being made of relatively stiff, bendable, flexible strip material, each strap having a laterally inner leg and a laterally outer leg extending alongside the inner leg in contact therewith, the legs of each strap extending lengthwise of the steering column and having corresponding ends integrally connected by a curved loop portion, means rigidly connecting the inner leg of each strap to the steering column, means rigidly connecting the outer leg of each strap to vehicle support structure, and releasable means connecting the legs of each strap to one another, said releasable means being adapted to release in a frontal impact to allow the inner leg of each strap to move with the steering column as it collapses, with the loop portion of each strap resisting such collapse to gradually absorb energy and prevent excessive reaction forces of the steering column against a driver.

2. An energy-absorbing device as defined in claim 1, wherein each leg of each of said straps is flat, said flat legs of each strap being in flush, surface-to-surface contact with one another.

3. An energy-absorbing device as defined in claim 2, wherein said releasable means connecting the legs of each strap to one another comprise shearable rivets.

4. An energy-absorbing device defined in claim 2, wherein the steering column extends longitudinally of the vehicle forwardly and rearwardly, and the legs of each strap extend forwardly from the loop portion thereof.

5. An energy-absorbing device as defined in claim 4, wherein said means rigidly connecting the inner leg of each strap to the steering column comprises an arcuate band rigidly secured to the steering column, and flanges on opposite sides of the steering column extending laterally outwardly from said band, said flanges being connected to forward ends of said respective inner legs, said band, flanges and straps being of integral, one-piece construction.

6. An energy-absorbing device as defined in claim 5, wherein the means rigidly connecting the outer leg of each strap to vehicle support structure comprises a bracket above the steering column, mounting flanges integral with the outer legs of said straps, and means securing said mounting flanges to said bracket.

7. An energy-absorbing device as defined in claim 6, wherein the vehicle support structure is an instrument panel of the vehicle.

8. An energy-absorbing device as defined in claim 7, wherein said releasable means connecting the legs of each strap to one another comprise shearable rivets.

9. An energy-absorbing device as defined in claim 8, wherein the legs of each of said straps have rear ends, the loop portion of each strap extends in an arc from the rear end of the inner leg laterally outwardly beyond a plane of the outer leg, then forwardly and finally laterally inwardly to the rear end of the outer leg.

* * * * *